> United States Patent Office 3,198,797
Patented Aug. 3, 1965

3,198,797
2,4-DICHLORO-6-DIALKYLHYDROXY-ANILINO-1,3,5-TRIAZINES
Martin Dexter, White Plains, Martin Knell, Ossining, and Eric A. Roskin, Bronx, N.Y., assignors to Geigy Chemical Corporation, Ardsley, N.Y., a corporation of Delaware
No Drawing. Original application Feb. 21, 1961, Ser. No. 87,520. Divided and this application Apr. 4, 1963, Ser. No. 273,539
2 Claims. (Cl. 260—249.5)

This application is a divisional application of co-pending application Serial No. 87,520, filed February 21, 1961, which in turn is a continuation-in-part of application Serial No. 47,159, filed August 3, 1960, now abandoned, which in turn is a continuation-in-part of application, Serial No. 21,604, filed April 12, 1960, now abandoned.

This invention relates to a method of stabilization with a substituted triazine and to compositions stabilized thereby. The invention also relates to novel substituted triazines.

In one aspect of the invention, dihalogen-substituted triazines, particularly the dichloro-substituted triazines of the formula:

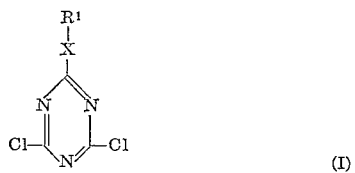

(I)

wherein $R^1$ represents substituted hydroxyaryl, preferably alkylhydroxyphenyl having from 7 to 24 carbon atoms, e.g., methylhydroxyphenyl, ethylhydroxyphenyl, propylhydroxyphenyl, butylhydroxyphenyl, octylhydroxyphenyl, octadecylhydroxyphenyl, dimethylhydroxyphenyl, dibutylhydroxyphenyl, etc.; and X represents —S—, —O— or $NR^2$—, wherein $R^2$ represents hydrogen, alkyl, preferably lower alkyl or aralkyl, preferably benzyl, are useful for stabilizing compositions of organic materials, such as e.g., polypropylene, etc.

A particularly preferred stabilizer of Formula I constituted by a compound of the formula:

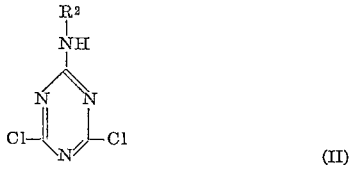

(II)

wherein $R^2$ represents alkylhydroxyphenyl having from 7 to 24 carbon atoms, e.g., methylhydroxyphenyl, ethylhydroxyphenyl, propylhydroxyphenyl, butylhydroxyphenyl, octylhydroxyphenyl, octadecylhydroxyphenyl, dimethylhydroxyphenyl, dibutylhydroxyphenyl, etc.

In this specification, the term "lower" signifies a group having from 1 to 6 carbon atoms, and "aryl" embraces within its meaning not merely carbocyclic, e.g., phenyl, naphthyl, etc., but also heterocyclic radicals, e.g., pyridyl, thiazolyl, etc.

Up to the present time, the use of the substituted triazines of the invention in stabilizing polymeric material, e.g., polypropylene, has not been known. It has now surprisingly been found that other organic materials are stabilized, e.g., against oxidative deterioration, by incorporating therein effective quantities of one of the substituted triazines defined according to the present invention hereinabove.

Accordingly, it is a prime object of the invention to provide stable organic material, preferably stable polymeric material, e.g., polypropylene. In this specification it is understood that polymeric material means polyolefins, such as polyethylene, etc. Preferably, the polyolefins are of high molecular weight, e.g., above 1000 into the hundreds of thousands range. The polyethylenes and polypropylenes may be of high density, medium density or low density class. The preferred polymeric material for stabilization is polypropylene.

Polymeric materials, such as the foregoing, find use as thermoplastic molding or coating agents. Moreover, because of their high dielectric strength and their resistance to water, they are particularly useful as insulators or dielectrics in condensers and other such equipment.

It is known that these polyolefins, e.g., polyethylene and polypropylene, are attacked by oxygen, particularly when exposed to the atmosphere and at elevated temperatures. For example, during use or manufacture the desirable properties of the polyolefins may be impaired due to oxidative deterioration. Such degradation causes loss in dielectric properties, discoloration, embrittlement, gelation, etc.

Not only homopolymeric material, but also copolymers and physical mixtures thereof are stabilized according to the present invention. For example, high impact polystyrene containing copolymers of butadiene and styrene is stabilized according to the invention.

The invention is also particularly useful in stabilizing lubricating oils of various types including aliphatic esters, such as for example dihexyl azelate, di-(2-ethylhexyl) azelate, di-(3,5,5-trimethylhexyl)glutarate, di-(3,5,5-trimethylphenyl)glutarate, di-(2-ethylhexyl)pimelate, di-(2-ethylhexyl)adipate, diisoamyl adipate, triamyl tricarballylate, pentaerythritol tetracaproate, dipropylene glycol dipelargonate, 1,5-pentanediol-di-(2-ethylhexanoate), etc.

The present invention also relates to the stabilizing of fatty materials including oils of animal and vegetable origin which tend to deteriorate on standing and exposure to atmospheric oxygen. Among the edible fats and oils within the scope of the present invention are: linseed oil, menhaden oil, cod liver oil, castor oil, olive oil, rapeseed oil, coconut oil, palm oil, corn oil, sesame oil, peanut oil, cotton seed oil, butter, fat, lard, beef tallow, etc. Other oils and fats which deteriorate on standing and exposure to oxygen in the air or oxygen at elevated temperatures, are all within the scope of the invention.

Within the scope of the invention, also, are saturated and unsaturated hydrocarbons which tend to deteriorate on storage, such as for example, gasolines, both natural and synthetic, in particular, saturated and unsaturated gasolines, etc., jet fuel, diesel oil, mineral oil, fuel oil, drying oil, waxes, resins, etc. Such hydrocarbons are protected against gum formation, discoloration and other deterioration with the stabilizers of the present invention.

It is, therefore, an object of the present invention to provide novel substituted triazine compounds which are versatile and effective stabilizers in at least a single class of the foregoing organic materials which are normally subject to deterioration caused by exposure to light and/or heat and/or oxygen, etc.

The stabilizers of the present invention are especially useful in stabilizing polyolefinic material, e.g., polypropylene and polyethylene, as well as other polymeric material, e.g. polystyrene, in particular "high impact" polystyrene. These triazines are also effective stabilizers for other relatively unstable organic material, e.g., hydrocarbon oil of mineral origin, in particular mineral oil; gasoline, both natural and synthetic; oils of animal origin, in particular, lard; oils of vegetable origin, in particular, cotton seed oil; high temperature lubricating oils, e.g. diesters of fatty acids, in particular, diesters of fatty acids having from 5 to 15 carbon atoms per molecule. Further organic materials which are effectively stabilized by this triazine comprise: aldehydes, e.g., aliphatic, such as heptaldehydes.

It is a prime object of the invention, therefore, to provide a method for stabilizing organic material, such as described hereinabove, by incorporating in said organic material a stabilizing amount of a triazine compound according to the invention.

It is understood that the stabilizers of the invention are not necessarily of equivalent potency. The specific stabilizer most useful to a given unstable material will depend upon several factors for its advantages. Availability and cost of raw materials for the manufacture of the stabilizer and effective inhibitory action of the stabilizer, including duration and degree of activity, are among the factors which control the choice of a specific stabilizer for a specific substrate which is normally subject to deterioration. Toxicity, color, stability to light and/or heat and solubility are also important factors. For example, a preferred stabilized composition according to the invention comprises from about 0.001% to about 5% by weight of a triazine stabilizer according to this invention in polypropylene.

The compounds of this invention may be used also to stabilize organic material in combination with other additive agents, such as for example, antioxidants, pour-point depressants, corrosion and rust inhibitors, dispersing agents, demulsifiers, antifoaming agents, carbon black, accelerators and other chemicals used in rubber compounding, plasticizers, color stabilizers, heat stabilizers, UV absorbers, dyes and pigments, etc.

Compounds of the Formulae I and II are also useful as intermediates in the synthesis of valuable di- and tri-substituted triazines which are themselves useful as stabilizers.

The compounds of the present invention are advantageously prepared, for example, according to the following:

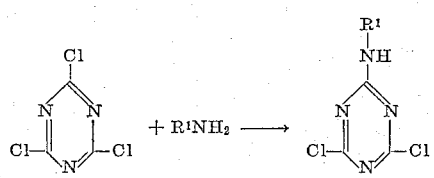

The following examples are illustrative of the invention, but by no means is the invention limited thereto. In all examples parts are by weight unless otherwise noted, and the relationship between parts by weight and parts by volume is as that of grams to cubic centimeters. The temperature is in degrees centigrade.

*Example 1.—6-(4-hydroxy-3,5-di-t-butylanilino)-2,4-dichloro-1,3,5-triazine*

(a) *4-nitroso-2,6-di-t-butylphenol.*—750 parts by volume of ethanol, cooled to 15°, are saturated with hydrogen chloride gas and then diluted by the addition of 4000 parts by volume of ethanol. 2,6-di-t-butylphenol (824 parts) is dissolved in the alcoholic solution and a solution of sodium nitrite (304 parts in 400 parts by volume of water) is added at 15–20° over a period of one hour while stirring. Stirring is continued for another 2 hours while allowing the temperature to rise to room temperature. 2000 parts by volume of water are added and the product is then separated by filtration and washed well with water. The filter cake is slurried in 3000 parts by volume of petroleum ether, filtered, washed on the filter with 1000 parts by volume of petroleum ether and dried in a vacuum oven at 70–80°. The yield of 4-nitroso-2,6-di-t-butylphenol, melting at 219°, is 848 parts (90.2%).

(b) *4-amino-2,6-di-t-butylphenol.*—4-nitroso-2,6-di-t-butylphenol (176 parts) is dissolved in 600 parts by volume of 5 N sodium hydroxide and 1200 parts by volume of water, and a solution of sodium hydrosulfite (522 parts) in 2200 parts by volume of water is added with moderate speed (about 30 minutes), during which time the temperature rises to 53°. After the addition is completed, stirring is continued for 2½ hours after which the product is filtered rapidly, washed with 4000 parts by volume of water and dried in a vacuum desiccator over phosphoric anhydride. The yield of 4-amino-2,6-di-t-butylphenol, melting at 105–108° is 162.3 parts (98.5%).

(c) *6-(4-hydroxy-3,5-di-t-butylanilino)-2,4-dichloro-1,3,5-triazine.*—A solution of cyanuric chloride (18.4 parts) in boiling acetone (100 parts by volume) is poured in a thin stream while stirring into 200 parts by volume of ice-water, keeping the temperature at 0–5° with external cooling. 4-amino-2,6-di-t-butylphenol (22.1 parts) and sodium carbonate (5.3 parts) are added and the reaction mixture is stirred vigorously at 8–10° for 45 minutes. The mixture is then diluted by the addition of 100 parts by volume of acetone and stirring is continued for an additional hour at 8–10°. The suspension is then poured into 500 parts by volume of ice-water, the precipitate is filtered off and dried in vacuo. The yield of 6-(4-hydroxy-3,5-di-t-butylanilino)-2,4-dichloro-1,3,5-triazine is 34.8 parts (94%). The product melts at 144°.

*Example 2*

*6-(4-hydroxy-3,5-di-t-butylphenoxy)-2,4-dichloro-1,3,5-triazine.*—18.4 parts of cyanuric chloride are dissolved in 250 parts by volume of acetone and cooled to 5° and stirred. To this mixture 22.2 parts of 2,6-di-t-butyl-1,4-hydroquinone are added, whereupon 20 parts by volume of 5 N sodium hydroxide in 250 parts by volume of water are added dropwise with stirring over a period of 30 minutes at 5°, and stirring is continued for a further 30 minutes at 5°. Then 250 parts by volume of water are added and the reaction mixture is stirred at 5° for 3 hours. The solid precipitate which forms is filtered, washed with ice-water, dried in vacuo, yielding 32.2 parts of the intermediate 6-(4-hydroxy-3,5-di-t-butylphenoxy)-2,4-dichloro-1,3,5-triazine, which can be recrystallized from warm isopropanol to give a pure crystalline material, melting at 103–104°.

If, in Example 1 (c), 4-amino-2-methylphenol is substituted for an equimolar amount of 4-amino-2,6-di-t-butylphenol, then 6-(4-hydroxy-3-methylanilino)-2,4-dichloro-1,3,5-triazine is obtained. Alternatively, if in the same example, 4-amino-2-octadecylphenol is employed instead, then 6-(4-hydroxy-3-octadecylanilino)-2,4-dichloro-1,3,5-triazine is obtained.

What is claimed is:

1. Compounds of the formula:

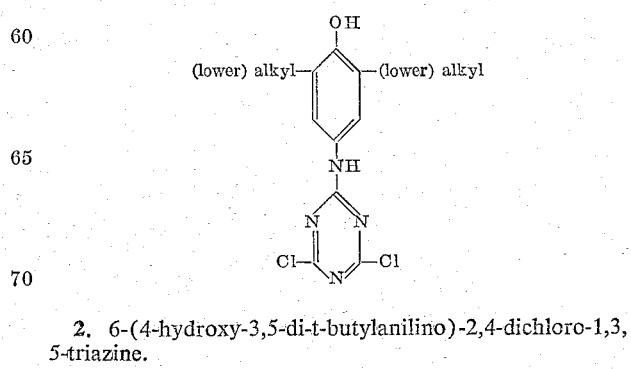

2. 6-(4-hydroxy-3,5-di-t-butylanilino)-2,4-dichloro-1,3,5-triazine.

(References on following page)

References Cited by the Examiner

UNITED STATES PATENTS

| | | | |
|---|---|---|---|
| 1,625,530 | 4/27 | Fritzsche et al. | 260—249.5 |
| 2,393,755 | 1/46 | D'Alelio | 260—249.6 |
| 2,720,480 | 10/55 | Wolf | 260—249.5 X |
| 2,728,767 | 12/55 | Wolf | 260—249.5 |
| 2,820,032 | 1/58 | Hill et al. | 260—249.5 |
| 2,944,999 | 7/60 | Abbruscato | 260—45.8 |
| 3,039,872 | 6/62 | De Boer et al. | 96—91 |
| 3,060,149 | 10/62 | Coran | 260—45.8 |

WALTER A. MODANCE, *Primary Examiner.*

NICHOLAS S. RIZZO, *Examiner.*